(12) United States Patent
Clausen et al.

(10) Patent No.: US 11,015,745 B2
(45) Date of Patent: May 25, 2021

(54) TUBE JOINTS, BRAZED TUBE JOINT ASSEMBLIES, AND METHODS OF MAKING TUBE JOINTS

(71) Applicant: Delavan Inc., West Des Moines, IA (US)

(72) Inventors: Derrick Clausen, Grimes, IA (US); Steven J. Myers, Norwalk, IA (US); David Heffernan, Urbandale, IA (US)

(73) Assignee: Delavan Inc., West Des Moines, IA (US)

( * ) Notice: Subject to any disclaimer, the term of this patent is extended or adjusted under 35 U.S.C. 154(b) by 367 days.

(21) Appl. No.: 15/949,737

(22) Filed: Apr. 10, 2018

(65) Prior Publication Data

US 2019/0309877 A1    Oct. 10, 2019

(51) Int. Cl.
| | | |
|---|---|---|
| *F16L 13/08* | (2006.01) | |
| *B23K 1/00* | (2006.01) | |
| *B23K 101/06* | (2006.01) | |
| *F23D 11/38* | (2006.01) | |

(52) U.S. Cl.
CPC ............... *F16L 13/08* (2013.01); *B23K 1/00* (2013.01); *B23K 2101/06* (2018.08); *F23D 11/38* (2013.01)

(58) Field of Classification Search
CPC .................................. F16L 13/08; F16L 13/10
USPC ............. 285/391, 289.2, 289.3, 288.5, 288.6
See application file for complete search history.

(56) References Cited

U.S. PATENT DOCUMENTS

| | | | | |
|---|---|---|---|---|
| 1,801,171 A | * | 4/1931 | Mueller ................. | F16L 13/08 285/289.5 |
| 1,877,433 A | * | 9/1932 | Ten Brook ............. | F16L 13/08 285/289.2 |
| 1,931,666 A | * | 10/1933 | Lindquist ................ | F16L 13/08 285/289.3 |
| 1,947,581 A | * | 2/1934 | Cornelius ............... | F16L 13/08 285/289.1 |
| 1,963,421 A | * | 6/1934 | Robinson ................ | F16L 13/08 285/289.1 |
| 2,329,956 A | * | 9/1943 | Hall ......................... | F16L 1/10 285/40 |

(Continued)

FOREIGN PATENT DOCUMENTS

| | | | | |
|---|---|---|---|---|
| CN | 201439847 | | 4/2010 | |
| EP | 2965821 A1 | | 1/2016 | |
| WO | WO-03036150 A1 | * | 5/2003 | ............. F16L 13/08 |

OTHER PUBLICATIONS

Extended European Search Report dated Jul. 23, 2019, issued during the prosecution of European Patent Application No. EP 19167444.9.

*Primary Examiner* — David Bochna
(74) *Attorney, Agent, or Firm* — Locke Lord LLP; Joshua L. Jones; Scott D. Wofsy (57) ABSTRACT

A tube joint includes a first member and a second member. The first member has a bore defining an inner diameter. The second member has a first outer surface defining a first outer diameter with two or more helical protrusions extending radially from the first outer diameter. The two or more helical protrusions collectively define a second outer diameter. The second outer diameter of the second member is larger than the inner diameter of the first member by an amount sufficient to center and retain the second member within the bore of the first member. Brazed tube joint assemblies and methods of making brazed tube joints are also described.

24 Claims, 7 Drawing Sheets

(56) References Cited

U.S. PATENT DOCUMENTS

| | | | | |
|---|---|---|---|---|
| 4,077,559 A * | 3/1978 | Watson, Jr. | ............ | B23K 1/0012 |
| | | | | 228/154 |
| 4,583,755 A * | 4/1986 | Diekman | ................ | B62K 19/30 |
| | | | | 280/281.1 |
| 4,613,079 A | 9/1986 | Mains | | |
| 4,887,557 A * | 12/1989 | Sukimoto | .......... | F02M 35/1036 |
| | | | | 29/890.08 |
| 4,941,788 A * | 7/1990 | Highfield | ............. | F16B 37/122 |
| | | | | 411/178 |
| 5,222,850 A * | 6/1993 | Medal | ..................... | B29C 65/08 |
| | | | | 285/21.2 |
| 5,400,951 A * | 3/1995 | Shiroyama | ............ | B23K 33/004 |
| | | | | 228/168 |
| 5,507,528 A * | 4/1996 | Mastrosimone | ........ | B23K 31/02 |
| | | | | 285/22 |
| 5,634,752 A * | 6/1997 | Haage | ....................... | B22F 5/00 |
| | | | | 411/82 |
| 6,592,287 B1 | 7/2003 | Hagle et al. | | |
| 6,648,375 B1 | 11/2003 | Panek | | |
| 7,802,692 B2 * | 9/2010 | Maejima | ................ | B65D 41/04 |
| | | | | 220/289 |
| 8,397,463 B2 * | 3/2013 | Allred, III | ................. | E04C 3/08 |
| | | | | 403/170 |
| 8,444,188 B2 * | 5/2013 | Pucciani | ............... | F16L 21/002 |
| | | | | 285/148.18 |
| 9,194,419 B2 * | 11/2015 | Martin | ................... | B29C 66/742 |
| 9,243,659 B2 * | 1/2016 | Raybuck | ................ | A61B 50/10 |
| 2004/0207202 A1 * | 10/2004 | Parks | ................... | F16L 37/105 |
| | | | | 285/391 |
| 2015/0167470 A1 | 6/2015 | Duijnhouwer et al. | | |

* cited by examiner

TUBE JOINTS, BRAZED TUBE JOINT ASSEMBLIES, AND METHODS OF MAKING TUBE JOINTS

BACKGROUND OF THE INVENTION

1. Field of the Invention

The present disclosure relates to joining techniques, and more particularly to centering and retaining tube joint members for fixation such as with or without materials like solder, braze and/or welding.

2. Description of Related Art

Joining typically involves fixation of parts to one another, generally inserting a portion of one part into the other part in a press-fitting, welding, soldering, or brazing technique. Press-fitting technique rely on the pressure of abutting surfaces of the parts form the joint between the parts. Welding generally involves fusing material from either (or both) parts to one another to form a joint between the parts. Soldering and brazing typically involve flowing solder or braze between adjacent surfaces of the parts which, once solidified, forms a joint between the parts.

One challenge to joining is centering and retaining the part to another. In some assemblies joining is accomplished by knurling the surface of part to be inserted to the other. Knurling locally deforms the surface of the part such that ridges circumferentially spaced apart from one another by depressions are defined about the part surface. In the case of thin-walled tubular parts fixed by solder or braze knurling locally thins and thickens tube wall, the thickened portions channelizing the solder or braze through the thinned sections to form the joint once solidified. Knurling parameters can require careful control to limit the localized thinning and thickening, particularly on thin-walled structures, and radiographic inspection can be necessary to access coverage.

Such conventional methods and systems have generally been considered satisfactory for their intended purpose. However, there is still a need in the art for improved tube joints, tube joint assemblies, and methods of making brazed assemblies. The present disclosure provides a solution for this need.

SUMMARY OF THE INVENTION

A tube joint includes a first member and a second member. The first member has a bore defining an inner diameter. The second member has a first outer surface defining a first outer diameter with two or more helical protrusions extending radially from the first outer diameter. The two or more helical protrusions collectively define a second outer diameter. The second outer diameter of the second member is larger than the inner diameter of the first member by an amount sufficient to center and retain the second member within the bore of the first member.

In certain embodiments the second member can have a helical bottom land surface. The helical bottom land surface can be adjacent to one of the helical protrusions. Two of the helical protrusions can be circumferentially spaced apart from one another by the helical bottom land surface.

In accordance with certain embodiments the second member can have a circumferential bottom land surface. The circumferential bottom land surface can be adjacent to one of the helical protrusions. Two of the helical protrusions can be axially spaced apart from one another by the circumferential bottom land surface. The circumferential bottom land surface and the helical land surface can be arranged on a common diameter.

It is contemplated that a braze alloy element can be coupled to the second member. The braze alloy element can be adjacent to the helical protrusions. Braze alloy can fix the second member within the bore of the first member. A surface of the second member having the two or more helical protrusions is unknurled.

A tube joint assembly includes a tube joint as described above. Two of the helical protrusion are circumferentially spaced apart from one another by a helical bottom land surface. Two of the helical protrusions are axially spaced apart from one another by a circumferential bottom land surface. The helical bottom land surface and the circumferential bottom land surface are arranged on a common diameter. Interference between the helical protrusion and bore of the first member can fix the second member within the bore of the first member. A weld can fix the second member within the bore of the first member. Solder can fix the second member within the bore of the first member. A braze alloy can fix the second member within the bore of the first member. It is contemplated that a braze alloy element can be coupled to the second member and adjacent to the two or more helical protrusions.

A method making a tube joint includes defining in an outer surface a first outer diameter having a plurality of helical protrusions extending radially from the first outer diameter of a member. A second outer surface is defined such that the helical protrusions collectively define a second outer diameter, the second diameter larger than the inner diameter by an amount sufficient to center and retain the member within the inner diameter of another member.

In certain embodiments a helical bottom land surface can be defined in the member using a first turning or milling operation. A circumferential bottom land surface can be defined using a second turning or milling operation. A braze alloy element can be coupled to the member at a location adjacent to the plurality of helical protrusions. The member can be centered and retained within a bore of another member. Molten braze or solder can be flowed across the helical bottom land surfaces and/or the circumferential bottom land surfaces. The molten braze or solder can there after solidify between the helical protrusions to fix the member within the other member.

These and other features of the systems and methods of the subject disclosure will become more readily apparent to those skilled in the art from the following detailed description of the preferred embodiments taken in conjunction with the drawings.

BRIEF DESCRIPTION OF THE DRAWINGS

So that those skilled in the art to which the subject disclosure appertains will readily understand how to make and use the devices and methods of the subject disclosure without undue experimentation, embodiments thereof will be described in detail herein below with reference to certain figures, wherein.

DETAILED DESCRIPTION OF THE PREFERRED EMBODIMENTS

Figure 1:
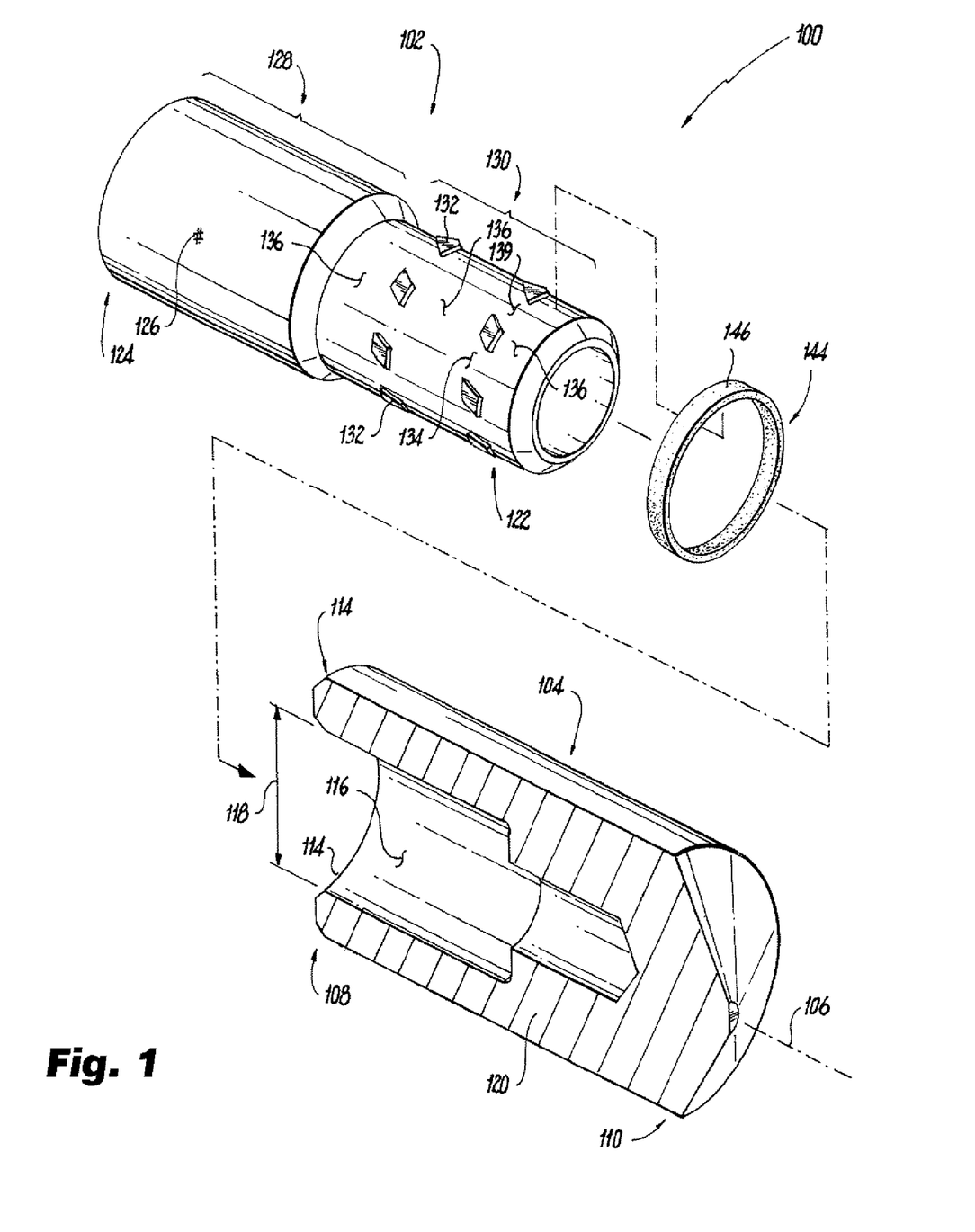
FIG. 1 is an exploded partially cross-sectional view of an exemplary embodiment of a cylindrical tube joint constructed in accordance with the present disclosure, showing a second member and braze alloy element exploded away from the bore of a first member.

Reference will now be made to the drawings wherein like reference numerals identify similar structural features or aspects of the subject disclosure. For purposes of explanation and illustration, and not limitation, a partial view of an exemplary embodiment of a cylindrical type tube joint in accordance with the disclosure is shown in FIG. 1 and is designated generally by reference character 100. Other embodiments of tube joints, brazed tube joint assemblies, and methods of making brazed tube joints in accordance with the disclosure, or aspects thereof, are provided in FIGS. 2-8, as will be described. The systems and methods described herein can be used to make brazed tube joint assembles, like fuel nozzles for gas turbine engines, though the present disclosure is not limited to fuel nozzles or tube joint assemblies in general.

Referring to FIG. 1, tube joint 100 is shown in an exploded view. Tube joint 100 includes a first member 104 and a second member 102. First member 104 has a bore 116 defining an inner diameter 118. Second member 102 has a first outer surface 134/136 defining a first outer diameter 140 (shown in FIG. 3) with two or more helical protrusions 132 extending radially from first outer diameter 140. The two or more helical protrusions 132 collectively define a second outer diameter 138 (shown in FIG. 3) that is larger than inner diameter 118 of first member 104 by an amount sufficient to center and retain the second member within bore 116 of the first member 104.

First member 104 defines an defines an axis 106 and has first end 108 and a second end 110. First end 108 is open to the external environment through an aperture 114 (in an unassembled state). It is contemplated that first member 104 be constructed of a metallic material 120. Metallic material 120 can include steel, a nickel-based alloy, brass or copper by way of non-limiting examples. Although shown as a blind bore 116, it is to be understood and appreciated that bore 116 can extend through an aperture (not shown) located on second end 110.

Second member 102 a first end 122 and a second end 124 and is formed from a metallic material 126. Metallic material 126 can include steel, a nickel-based alloy, brass or copper by way of non-limiting examples. In the illustrated exemplary embodiment second member 102 has both a large diameter segment 128 and a small diameter segment 130. Large diameter segment 128 has a diameter that is greater than internal diameter 118 of first member 104, is arranged on second end 124, and is axially adjacent to small diameter segment 130. Though illustrated as having both a large diameter segment 128 and a small diameter segment 130, it is to be understood and appreciated that second member 102 can be a singular tube segment having a constant diameter with centering and retention features machined into the constant diameter of the singular tube segment. Further, although described herein as tube member, it is to be appreciated and understood that non-tubular structures can also benefit from the present disclosure, such as rod-like and non-circular structures.

Helical protrusions 132, helical bottom land surfaces 134, and circumferential bottom land surfaces 136 are defined on small diameter segment 130. Helical bottom land surfaces 134 are adjacent to circumferentially adjacent helical protrusions 132. Circumferential bottom land surfaces are adjacent to axially adjacent helical protrusions 132. It is contemplated that helical bottom lands surfaces 134 and circumferential bottom land surfaces 136 be arranged on a common diameter, e.g., first outer diameter 140 (shown in FIG. 3). It is also contemplated that first outer diameter 140 and the second outer diameter 138 be defined by an unknurled surface, such as a surface defined using a turning or milling operation.

Tube joint 100 is assembled by coupling a braze alloy element 144 to first end 122 of second member 102. Braze alloy element 144 includes a braze material 146 selected such that, when molten, braze material 146 flows by capillary action into a gap between second member 102 and first member 104. In the illustrated exemplary embodiment braze alloy element 144 has an annular shape and seats about circumferential bottom land surface 136. It is contemplated that braze alloy element 144 can alternatively (or additionally) include a braze paste or a braze foil having braze material 146, as suitable for an intended application.

Figure 2:
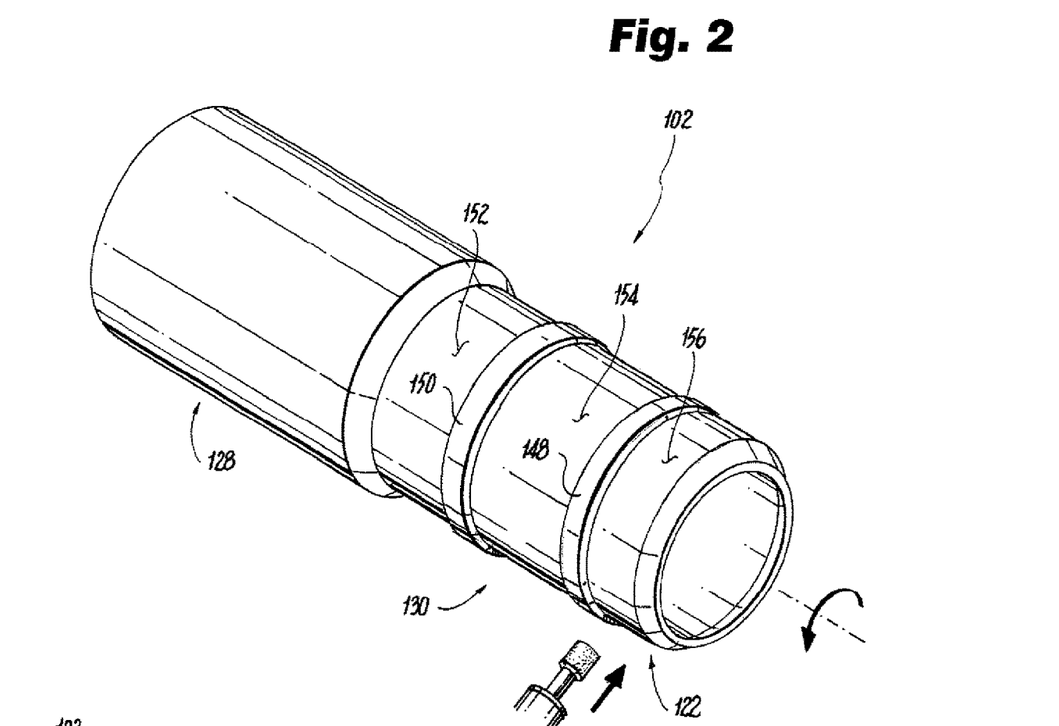
FIG. 2 is a perspective end view of second member of FIG. 1, showing circumferential bottom land surfaces being defined on the second member in a turning or milling operation.
Figure 3:
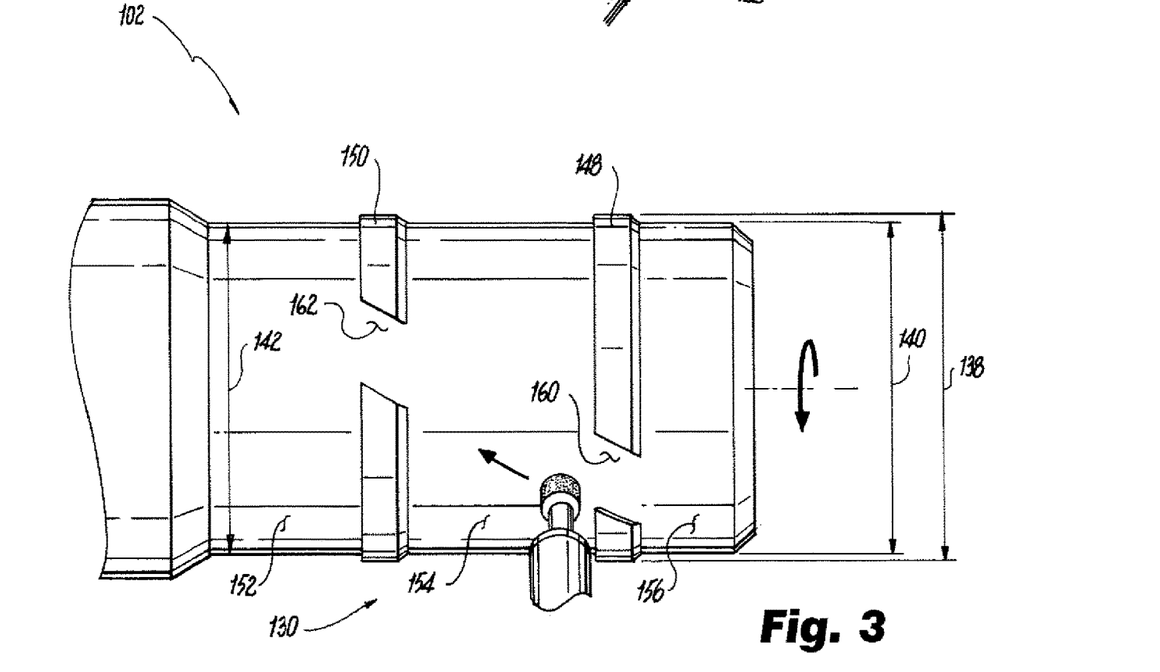
FIG. 3 is a side elevation view of the second member of FIG. 1, shown helical protrusions and helical bottom land surfaces being defined on the second member in a turning or milling operation.
Figure 4:
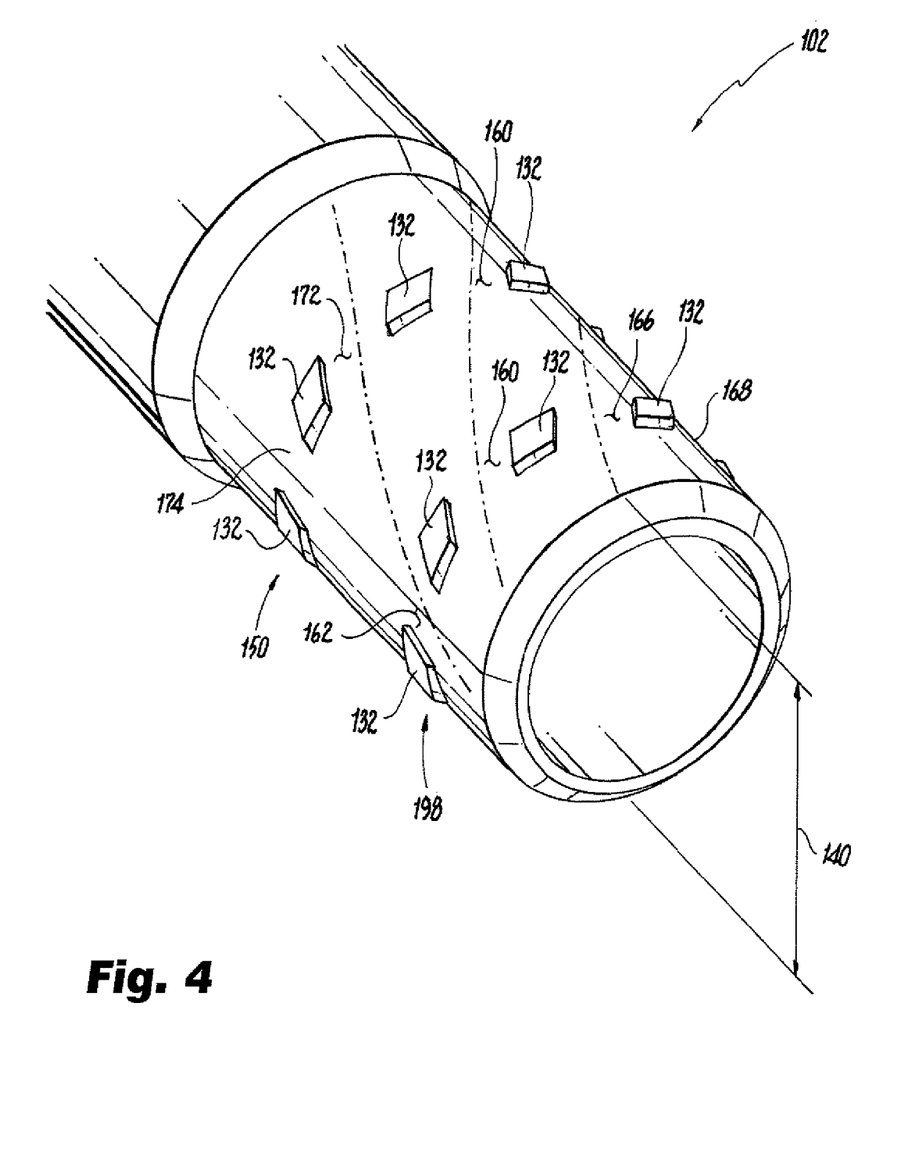
FIG. 4 is a perspective end view of the second member of FIG. 1, showing a plurality of helical protrusions, helical bottom land surfaces, and circumferential bottom land surfaces defined on the second member.

With reference to FIGS. 2-4, circumferential bottom land surfaces 136 (shown in FIG. 1), helical bottom land surfaces 134 (shown in FIG. 1), and helical protrusions (shown in FIG. 1) are shown being formed on the outer surface of second member 102. Referring to FIG. 2, second member 102 is shown undergoing a first turning or milling operation. First end 122 of second member 102 is turned to define a plurality of circumferential bottom land surfaces 152-156 and a plurality of annular 148-150. In the illustrated exemplary embodiment first end 122 is turned down from a relatively large diameter defined (shared by second end 124) such that a first annulus 148 and a second annulus 150 are defined along first end 122. Once turned first annulus 148 and second annulus 150 have diameters corresponding to second outer diameter 138 (shown in FIG. 3).

The first turning or milling operation defines a first circumferential bottom land surface 152. First circumferential bottom land surface 152 is defined axially between second end 124 and first annulus 148. The first turning or milling operation also defines a second circumferential bottom land surface 154. Second circumferential bottom land surface 154 is defined axially between first annulus 148 and second annulus 150. One or more third circumferential bottom land surface 156, third circumferential bottom land surface 156 defined between second annulus 150 and the end of second member first end 122. Although two annuluses are shown in the illustrated exemplary embodiment it is to be understood and appreciated that second member 102 can be formed with a single annulus or more than two annuluses, as suitable for an intended application.

Referring to FIG. 3, a second turning or milling operation is shown. The second turning or milling operation removes material from first annulus 148 and second annulus 150 by tracing a helical path along second member 102. This defines a first helical bottom land surface 160 and a second helical bottom land surface 162 along small diameter segment 130. Material removal during the second turning or milling operation occurs along a helical path (shown by the arrow) that causes the first helical bottom land surface 160 to be bounded axially by third circumferential bottom land surface 156 and second circumferential bottom land surface 154, and circumferentially by first annulus 148. Material removal during the second turning or milling operation also causes the second helical bottom land surface 162 to be bounded axially be second circumferential bottom land surface 154 and first circumferential bottom land surface 152, and circumferentially by second annulus 150.

It is contemplated that first helical bottom land surface 160 and second helical bottom land surface 162 each be cut in a turning or milling operation, such as by using the same lathe used to define first circumferential bottom land surface 152, second circumferential bottom land surface 154, and third circumferential bottom land surface 156. As will appreciated, using a common lathe can reduce the number of setup operations otherwise needed to form the helical protrusions 132 on second member 102 for centering and retaining second member 102 in first member 104.

As shown in FIG. 4, once first helical bottom land surface 160 and second helical bottom land surface 162 are defined, additional helical bottom land surfaces are defined within first annulus 148 (shown in FIG. 3) and second annulus 150 (shown in FIG. 3) about the circumference of second member 102. In this respect a third helical bottom land surface 166 and fourth helical bottom land surface 168 are defined through first annulus 148, thereby defining a plurality of helical protrusions 132 arranged on a first common circumference, e.g., a common circumference defined by second outer diameter 138 (shown in FIG. 3). In the illustrated exemplary embodiment, a fifth helical bottom land surface 172 and a sixth helical bottom land surface 174 are defined through second annulus 150, thereby defining a plurality of helical protrusions 132 arranged of a second common circumference and separated from the plurality of helical protrusions 132 arranged on the first common circumference by second circumferential bottom land surface 154.

Figure 5:
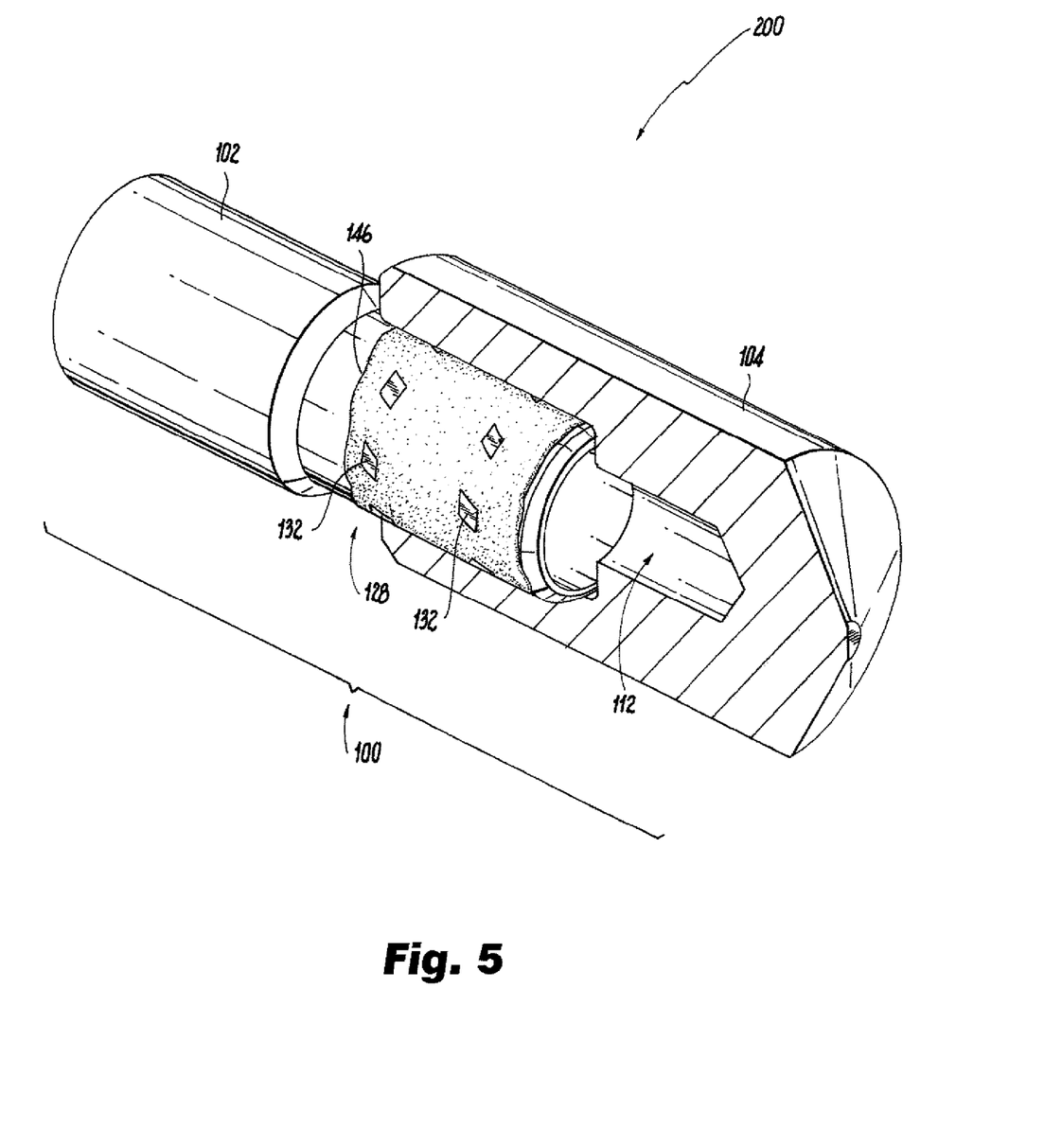
FIG. 5 is a perspective partially cross-sectional end view of an exemplary embodiment of a tube joint constructed in accordance with the present disclosure, showing the first end of a second member fixed within the bore of the first member by a braze alloy.

With reference to FIG. 5, a brazed tube joint assembly 200 is shown in a partially cross-sectional view. Brazed tube joint assembly 200 includes tube joint 100. Tube joint 100 is formed by the plurality of helical protrusions 132 defined on small diameter segment 130, which define an interference fit between first member 104 and second member 102, and braze material 146. Braze material 146 is disposed between circumferentially adjacent helical protrusions 132 and fixes and second member 102 within bore 112 of first member 104.

Figure 6:
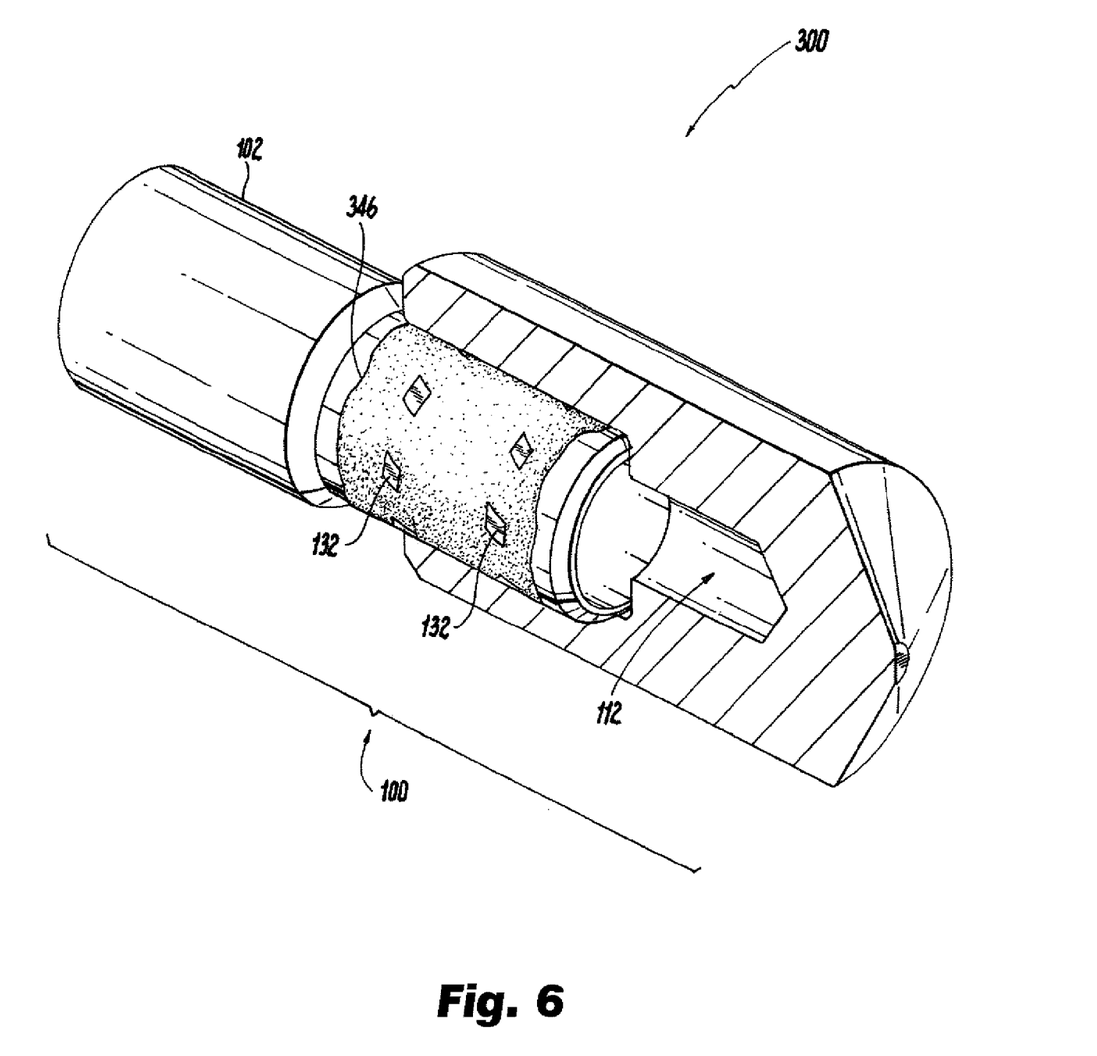
FIGS. 6-8 are a perspective partially cross-sectional end view of an exemplary embodiment of a tube joint constructed in accordance with the present disclosure, showing the first end of a second member fixed within the bore of the first member by an interference fit, solder, and a weld.
Figure 7:
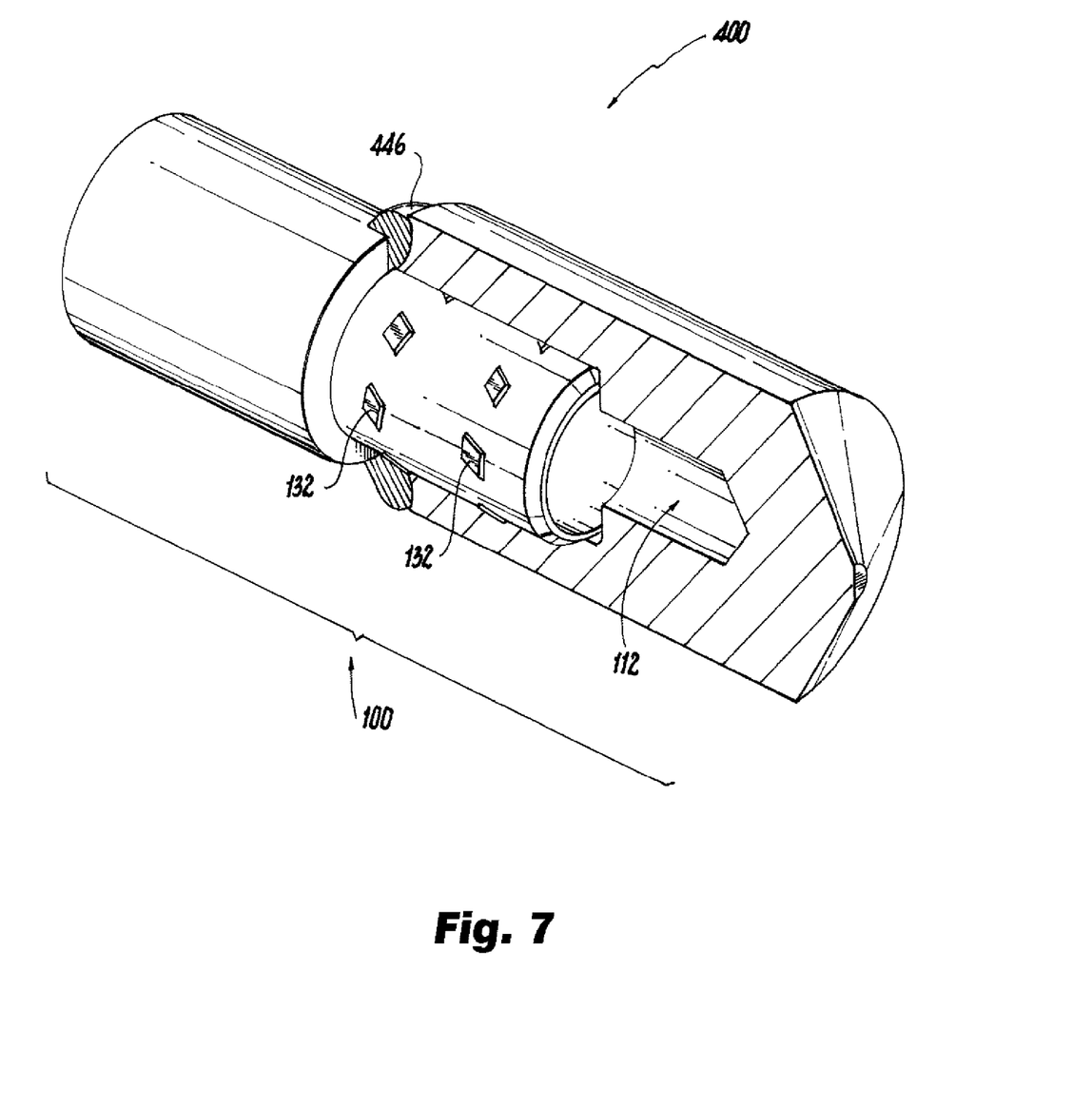
Figure 8:
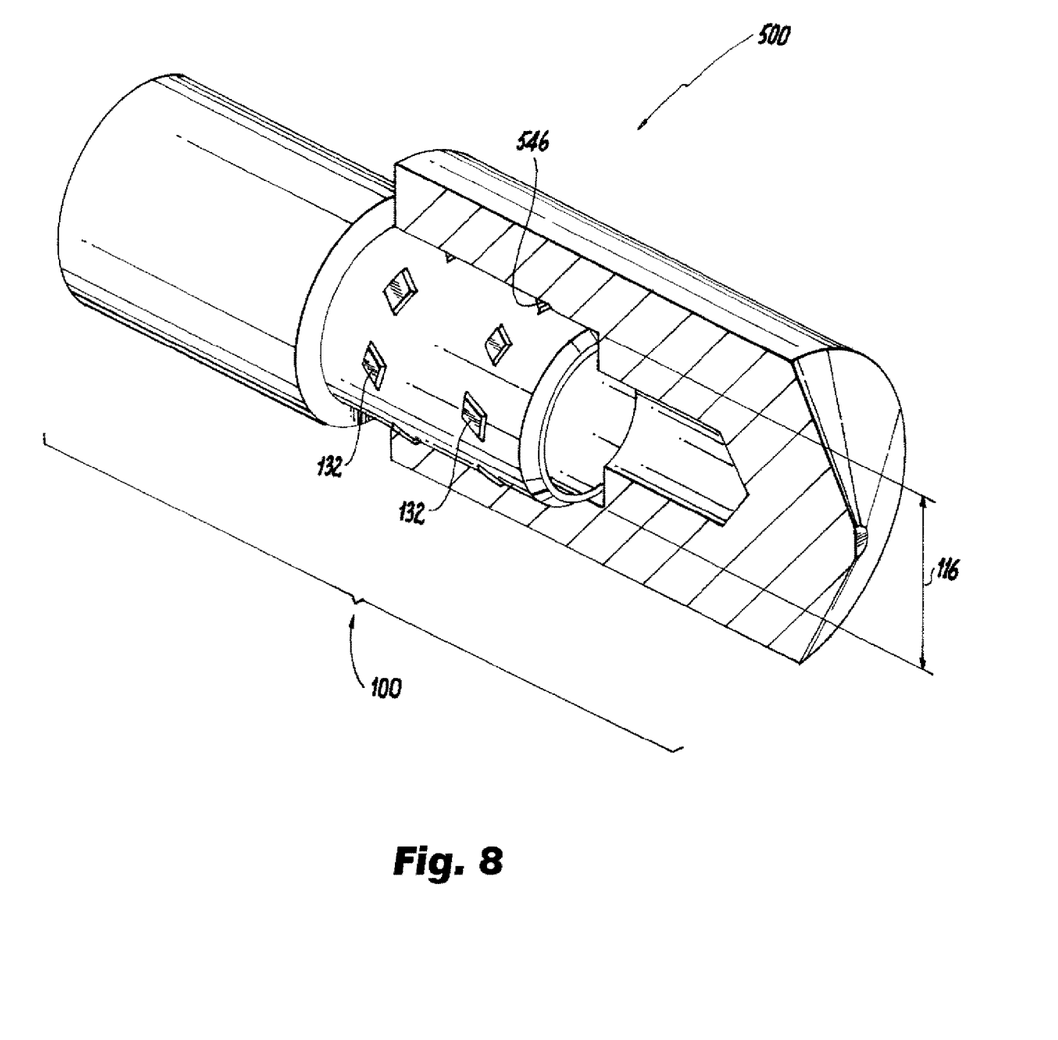

Referring to FIGS. 6-8, although described in terms of a brazed tube joint it is contemplated that helical protrusions 132 can be used to fix second member 102 within bore 112 of first member 104 without the use of braze. For example, as shown in FIG. 6, solder 346 can be used to fix second member 102 within bore 112 of first member 104, helical protrusions 132 of tube joint 100 centering and retaining second member 102 within bore 112 of first member 104 during heating and movement of solder 346 into tube joint 100 and between adjacent surfaces via capillary action.

Alternatively, as shown in FIG. 7, a weld 446 can be used to fix second member 102 within bore 112 of first member 104, helical protrusions 132 of tube joint 100 centering and retaining second member 102 within bore 112 of first member 104 during the application of heat sufficient to fuse material to form weld 446. It is also contemplated that, as shown in FIG. 8, an interference fit 546 between helical protrusions 132 and bore 112 can be used to fix second member 102 within bore 112 of first member 104, helical protrusions 132 centering and retaining alignment of second member 102 relative to first member 104 during a press-fitting process.

As will be appreciated by those of skill in the art in view of the present disclosure, raised features defined on second member can used to center and retain tube joint elements during joining operations like soldering, brazing, or welding. The features can be defined using a knurling operation, such as a straight knurl, which can form ridges about the surface of one of the elements with valleys between circumferential ridges. The ridges can engage an overlaying surface while the valleys serve to channelize braze as the braze flows through the valleys to fix the tube joint elements to one another.

While generally satisfactory, knurling can require very specific knurling parameters. For example, the pressure exerted by the knurling tool can require careful control as pressing the knurling tool deeply into the part, distorting the part and creating knurl valleys which can potentially cause voids in the brazed joints subsequently formed over the knurled area. To ensure uniformity and inspect for voiding, x-ray inspection of the non-concentric features and valleys formed during the knurling process.

In embodiments described herein helical protrusions are defined into the outside diameter of the second member. The helical protrusions are formed with a diameter large enough to create interference with the female joint member when press fit into the female joint member, thereby centering and retaining the second member within the bore of the first member. Helical bottom land surfaces are defined between circumferentially adjacent helical protrusions to channelize molten braze alloy flowing between circumferentially adjacent helical protrusions to ensure that the molten braze alloy suitably covers adjacent surfaces of the first member and the centered and retained second member.

In accordance with certain embodiments the helical protrusions can be formed using a lathe. In this respect the second member can be turned to define an annulus extending about the second member having an outer diameter suitable for press fitting the second member in the first member, the annulus bounded on axially opposite sides by first and second circumferential bottom land surfaces. Helical grooves are then defined through the annulus using the lathe, the helical grooves defining helical bottom lands between circumferentially adjacent helical protrusions to channelize molten braze alloy flowing between the helical protrusions.

The methods and systems of the present disclosure, as described above and shown in the drawings, provide for tube joints with superior properties with superior properties including helical protrusions suitable for centering and retaining second members in first members without knurling the second member. In certain embodiments unknurled surfaces have no valleys that can otherwise lead to braze voids within tube joints formed from the centered and retained second member and first member, improving reliability of the tube joint, and potentially reducing the need to x-ray inspect the tube joint assembly for braze voids. While the apparatus and methods of the subject disclosure have been shown and described with reference to preferred embodiments, those skilled in the art will readily appreciate that changes and/or modifications may be made thereto without departing from the scope of the subject disclosure.

What is claimed is:

1. A tube joint, comprising:
a first member having a bore defining an inner diameter; and
a second member with a first outer surface defining a first outer diameter having a plurality of helical protrusions extending radially from the first outer diameter, a second outer surface on each of the plurality of protrusions collectively defining a second outer diameter, wherein the second diameter larger than the inner diameter by an amount sufficient to center and retain the second member within the bore of the first member, wherein the helical protrusions are separated from one another in an axial direction by circumferential bottom land surfaces, and wherein the helical protrusions are separated from one another in a circumferential direction by helical bottom land surfaces, further comprising a braze alloy element coupled to the second member adjacent to the two or more helical protrusions.

2. The tube joint as recited in claim 1, wherein the helical bottom land surfaces and the circumferential bottom land surfaces are arranged on a common diameter.

3. The tube joint as recited in claim 1, wherein a surface of the second member having the two or more helical protrusions is unknurled.

4. The tube joint as recited in claim 1, wherein the second member is fixed within a bore of a first member by solder, a weld, or an interference fit defined between the plurality of helical protrusions and the bore.

5. A tube joint, comprising:
a first member having a bore defining an inner diameter; and
a second member with a first outer surface defining a first outer diameter having a plurality of helical protrusions extending radially from the first outer diameter, a second outer surface on each of the plurality of protrusions collectively defining a second outer diameter, wherein the second diameter larger than the inner diameter by an amount sufficient to center and retain the second member within the bore of the first member, wherein the helical protrusions an separated from one another in an axial direction by circumferential bottom land surfaces, and wherein the helical protrusions are separated from one another in a circumferential direction by, helical bottom land surfaces, further comprising a braze alloy fixing the second member within the bore of the first member.

6. The tube joint as recited in claim 5, wherein the helical bottom land surfaces and the circumferential bottom land surfaces are arranged on a common diameter.

7. The tube joint as recited in claim 5, wherein a surface of the second member having the two or more helical protrusions is unknurled.

8. The tube joint as recited in claim 5, wherein the second member is fixed within a bore of a first member by solder, a weld, or an interference fit defined between the plurality of helical protrusions and the bore.

9. A tube joint, comprising:
a first member having a bore defining an inner diameter; and
a second member with a first outer surface defining a first outer diameter having a plurality of helical protrusions extending radially from the first outer diameter, a second outer surface on each of the plurality of protrusions collectively defining a second outer diameter, wherein the second diameter larger than the inner diameter by an amount sufficient to center and retain the second member within the bore of the first member, wherein the helical protrusions are separated from one another in an axial direction by circumferential bottom land surfaces, and wherein the helical protrusions are separated from one another in a circumferential direction by helical bottom land surfaces, wherein the helical bottom land surfaces and the circumferential bottom land surfaces are arranged on a common diameter, the tube joint further comprising a braze alloy element coupled to the second member and adjacent to the two or more helical protrusions.

10. The tube joint as recited in claim 9, wherein the helical bottom land surfaces and the circumferential bottom land surfaces are arranged on a common diameter.

11. The tube joint as recited in claim 9, wherein a surface of the second member having the two or more helical protrusions is unknurled.

12. The tube joint as recited in claim 9, wherein the second member is fixed within a bore of a first member by solder, a weld, or an interference fit defined between the plurality of helical protrusions and the bore.

13. A tube joint, comprising:
a first member having a bore defining an inner diameter; and
a second member with a first outer surface defining a first outer diameter having a plurality of helical protrusions extending radially from the first outer diameter, a second outer surface on each of the plurality of protrusions collectively defining a second outer diameter, wherein the second diameter larger than the inner diameter by an amount sufficient to center and retain the second member within the bore of the first member, wherein the helical protrusions are separated from one another in an axial direction by circumferential bottom land surfaces, and wherein the helical protrusions are separated from one another in a circumferential direction by helical bottom land surfaces, wherein the helical bottom land surfaces and the circumferential bottom land surfaces are arranged on a common diameter, the tube joint further comprising a braze alloy fixing the second member within the bore of the first member.

14. The tube joint as recited in claim 13, wherein the helical bottom land surfaces and the circumferential bottom land surfaces are arranged on a common diameter.

15. The tube joint as recited in claim 13, wherein a surface of the second member having the two or more helical protrusions is unknurled.

16. The tube joint as recited in claim 13, wherein the second member is fixed within a bore of a first member by solder, a weld, or an interference fit defined between the plurality of helical protrusions and the bore.

17. A tube joint, comprising:
a first member having a bore defining an inner diameter; and
a second member with a first outer surface defining a first outer diameter having a plurality of helical protrusions extending radially from the first outer diameter, a second outer surface on each of the plurality of protrusions collectively defining a second outer diameter, wherein the second diameter larger than the inner diameter by an amount sufficient to center and retain the second member within the bore of the first member, wherein the helical protrusions are separated from one another in an axial direction by circumferential bottom land surfaces, and wherein the helical protrusions are separated from one another in a circumferential direction by helical bottom land surfaces, wherein the helical bottom land surfaces and the circumferential bottom land surfaces are arranged on a common diameter, the tube joint, further comprising solder, a weld, or an interference fit between the helical protrusions and the bore fixing the second member within the bore of the first member.

18. The tube joint as recited in claim 17, wherein the helical bottom land surfaces and the circumferential bottom land surfaces are arranged on a common diameter.

19. The tube joint as recited in claim 17, wherein a surface of the second member having the two or more helical protrusions is unknurled.

20. The tube joint as recited in claim 17, wherein the second member is fixed within a bore of a first member by solder, a weld, or an interference fit defined between the plurality of helical protrusions and the bore.

21. A method of making a tube joint, comprising:
defining, in an outer surface of a member a first outer diameter having a plurality of helical protrusions extending radially from the first outer diameter; and
defining a second outer surface on each of the plurality of helical protrusions, the plurality of helical protrusions collectively defining a second outer diameter, the second diameter being larger than the inner diameter by an amount sufficient to center and retain the member within the bore of another member, wherein defining the first outer diameter includes defining a helical bottom land surface in the member using a turning or milling operation, wherein defining the first outer diameter includes defining a circumferential bottom land surface in the member using a turning or milling operation, the method further comprising coupling a braze alloy element on the member at a location adjacent to the plurality of helical protrusions.

22. The method as recited in claim 21, wherein the member is a first member, and further comprising centering and retaining the first member within a bore of a second member.

23. A method of making a tube joint, comprising:
defining in an outer surface of a member a first outer diameter having a plurality of helical protrusions extending radially from the first outer diameter; and
defining a second outer surface on each of the plurality of helical protrusions, the plurality of helical protrusions collectively defining a second outer diameter the second diameter being larger than the inner diameter by an amount sufficient to center and retain the member within the bore of another member, wherein defining the first outer diameter includes defining a helical bottom land surface in the member using a turning or milling operation, wherein defining the first outer diameter includes defining a circumferential bottom land surface in the member using a turning or milling operation, the method further comprising flowing molten braze between the helical protrusions.

24. The method as recited in claim 23, wherein the member is a first member, and further comprising centering and retaining the first member within a bore of a second member.

* * * * *